(12) United States Patent
Hughes et al.

(10) Patent No.: US 12,700,003 B2
(45) Date of Patent: Aug. 4, 2026

(54) SYSTEMS AND METHODS FOR FREQUENT MACHINE LEARNING MODEL RETRAINING AND RULE OPTIMIZATION

(71) Applicant: JPMORGAN CHASE BANK, N.A., New York, NY (US)

(72) Inventors: Mike Hughes, Delaware, DE (US); Yea Kang Yoon, Wilmington, DE (US); Fang-Yu Lin, New York, NY (US); Ramana Nallajarla, New York, NY (US); Sambasiva R Vadlamudi, Garnet Valley, NY (US); Josh X Jiang, New York, NY (US); Hari Sivaprasad, New York, NY (US); Benedict Hall, New York, NY (US); Lifeng Wang, New York, NY (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 956 days.

(21) Appl. No.: 17/804,537

(22) Filed: May 27, 2022

(65) Prior Publication Data

US 2023/0385836 A1 Nov. 30, 2023

(51) Int. Cl.
*G06Q 20/40* (2012.01)
*G06N 20/00* (2019.01)
*G06N 20/20* (2019.01)

(52) U.S. Cl.
CPC ......... *G06Q 20/4016* (2013.01); *G06N 20/00* (2019.01); *G06N 20/20* (2019.01)

(58) Field of Classification Search
CPC .. G06Q 20/4016; G06Q 20/401; G06Q 20/40; G06N 20/00; G06N 20/20

(Continued)

(56) References Cited

U.S. PATENT DOCUMENTS

2008/0059301 A1* 3/2008 Granville ........... G06Q 30/0277
705/14.6
2009/0106178 A1* 4/2009 Chu ........................ G06N 5/02
706/14

(Continued)

OTHER PUBLICATIONS

Kim et al., "Champion-challenger analysis for credit card fraud detection: Hybrid ensemble and deep learning", Expert Systems With Applications 128, Mar. 25, 2019, pp. 214-224. (Year: 2019).*

(Continued)

*Primary Examiner* — Hwei-Min Lu
(74) *Attorney, Agent, or Firm* — GREENBERG TRAURIG LLP

(57) ABSTRACT

Systems and methods for frequent machine learning model retraining and rule optimization are disclosed. In accordance with aspects, a method may include generating a challenger machine learning model based on a production machine learning model; training the challenger machine learning model on a plurality of datasets; scoring historical data with the challenger machine learning model, wherein the scoring produces a respective score for each record of a plurality of records in the historical data; determining that the challenger model performs within predetermined thresholds based on the scoring; selecting an optimal scaler value for a rule based on execution of the rule with a range of scaler values applied to the respective score for each record of the plurality of records evaluated by the rule; determining that the optimal scaler value outperforms a production scaler value; and promoting the challenger model and the optimal scaler value to a production environment.

16 Claims, 9 Drawing Sheets

(58) Field of Classification Search
USPC ........................................................... 706/12
See application file for complete search history.

(56) References Cited

U.S. PATENT DOCUMENTS

| 2014/0081652 A1* | 3/2014 | Klindworth | ........ G06Q 10/0635 |
| | | | 705/2 |
| 2014/0282856 A1* | 9/2014 | Duke | ...................... H04L 63/20 |
| | | | 726/1 |
| 2015/0142713 A1* | 5/2015 | Gopinathan | ........... G06Q 40/03 |
| | | | 706/14 |
| 2016/0086185 A1* | 3/2016 | Adjaoute | ........... G06Q 20/4016 |
| | | | 705/44 |
| 2016/0127319 A1* | 5/2016 | Xiong | ................. H04L 63/1425 |
| | | | 726/1 |
| 2017/0091673 A1* | 3/2017 | Gupta | .................... G06N 5/022 |
| 2020/0234305 A1* | 7/2020 | Knutsson | ............... G06N 20/00 |
| 2020/0280578 A1* | 9/2020 | Hearty | ............... H04L 63/1433 |
| 2021/0192532 A1* | 6/2021 | Thomson | ............. G06Q 20/388 |
| 2022/0012352 A1* | 1/2022 | Boding | ................... G06N 20/00 |
| 2022/0044248 A1* | 2/2022 | Amitai | ................... G06N 20/00 |

OTHER PUBLICATIONS

Mohebali et al., "An Evolutionary Framework for Real-Time Fraudulent Credit Detection", 2021 IEEE Congress on Evolutionary Computation (CEC), Jun. 28-Jul. 1, 2021, pp. 1999-2006. (Year: 2021).*

Gu, Siyu; et al., "Real Negatives Matter: Continuous Training with Real Negatives for Delayed Feedback Modeling", Aug. 12, 2021.

* cited by examiner

SYSTEMS AND METHODS FOR FREQUENT MACHINE LEARNING MODEL RETRAINING AND RULE OPTIMIZATION

RELATED APPLICATIONS

This application is related to the following U.S. Patent Applications:

Patent application Ser. No. 17/804,527, filed May 27, 2022, entitled SYSTEMS AND METHODS FOR FREQUENT MACHINE LEARNING MODEL RETRAINING AND RULE OPTIMIZATION; and Patent application Ser. No. 17/804,529, filed May 27, 2022, entitled SYSTEMS AND METHODS FOR FREQUENT MACHINE LEARNING MODEL RETRAINING AND RULE OPTIMIZATION.

The disclosure of each of the applications noted, above, is hereby incorporated by reference in its entirety.

BACKGROUND

1. Field of the Invention

Aspects are generally related to systems and methods for frequent, machine learning model retraining and rule optimization.

2. Description of the Related Art

Conventional techniques for machine learning (ML) model re-training on datasets that may be more reflective of recent trends and patterns take extended periods of time and large amounts of manual effort from data science teams and other supporting teams. Due to the amount of time model re-training takes, deployment of freshly trained models can be limited to sub-optimal intervals, causing a lag behind emerging trends and patterns that organizations wish to identify in a timelier manner. Even the best efforts of a machine learning modeling team using conventional training techniques may still only produce a freshly trained model once every several weeks (e.g., once every 4-8 weeks). Such a large time interval may not be sufficiently short enough to stay ahead of rapidly changing trends and patterns that will emerge after data in the modeled dataset was captured.

Moreover, conventional frameworks for integrating the output of retrained models into operations are likely not equipped to handle shifted output from a retrained model on very short time intervals. Distribution shifts of output populations from retrained models may result in an organization's related operations receiving significantly more or less actionable data because rules applied to the output were not properly optimized after retraining. This can result in an organization's related operations being overwhelmed or underwhelmed if rules incorporating a retrained model's output are not properly optimized and the rules' decisioning is not normalized. Like the retraining of ML models, however, frequent manual updating (e.g., daily) of associated rules is not feasible.

SUMMARY

In some aspects, the techniques described herein relate to a method for frequent machine learning model retraining and rule optimization, including: generating a challenger machine learning model based on a production machine learning model; training the challenger machine learning model on a plurality of datasets, wherein each of the plurality of datasets includes data records collected on a date defined as a number of days previous to a current date; scoring historical data with the challenger machine learning model, wherein the scoring produces a respective score for each record of a plurality of records in the historical data; determining that the challenger model performs within predetermined thresholds based on the scoring; selecting an optimal scaler value for a rule based on execution of the rule with a range of scaler values applied to the respective score for each record of the plurality of records evaluated by the rule; determining that the optimal scaler value outperforms a production scaler value; and promoting the challenger model and the optimal scaler value to a production environment.

In some aspects, the techniques described herein relate to a method, wherein the plurality of datasets includes a first dataset, and wherein the first dataset includes data records collected on a date defined as 1 day previous to the current day; wherein the plurality of datasets includes a second dataset, and wherein the second dataset includes data records collected on a date defined as 14 days previous to the current day; and wherein the plurality of datasets includes a third dataset and wherein the third dataset includes data records collected on a date defined as 90 days previous to the current day.

In some aspects, the techniques described herein relate to a method, wherein the plurality of datasets and the historical data include payment transaction data.

In some aspects, the techniques described herein relate to a method, wherein the scoring produces respective fraud scores for each record of the historical data.

In some aspects, the techniques described herein relate to a method, wherein the rule is a segment rule for a segment, and wherein the segment is defined by a transaction type.

In some aspects, the techniques described herein relate to a method, wherein the segment is one of a plurality of segments, and where each of the plurality of segments is defined by a different rule type.

In some aspects, the techniques described herein relate to a method, wherein each segment of the plurality of segments includes a segment rule and wherein each segment rule includes a scaler value of which can be set independently.

In some aspects, the techniques described herein relate to a method, wherein the historical data is data collected within a predetermined time window.

In some aspects, the techniques described herein relate to a method, wherein the predetermined time window is from the date defined as 1 day previous to the current date to the date defined as 14 days previous to the current date.

In some aspects, the techniques described herein relate to a method, wherein the challenger machine learning model is based on an extreme gradient boosting algorithm.

In some aspects, the techniques described herein relate to a system for frequent machine learning model retraining and rule optimization including at least one computing device including a processor, wherein the at least one computing device is configured to: generate a challenger machine learning model based on a production machine learning model; train the challenger machine learning model on a plurality of datasets, wherein each of the plurality of datasets includes data records collected on a date defined as a number of days previous to a current date; score historical data with the challenger machine learning model, wherein the scoring produces a respective score for each record of a plurality of records in the historical data; determine that the challenger model performs within predetermined thresholds based on the scoring; select an optimal scaler value for a rule based on execution of the rule with a range of scaler values applied to the respective score for each record of the plurality of records evaluated by the rule; determin that the optimal scaler value outperforms a production scaler value; and promote the challenger model and the optimal scaler value to a production environment.

In some aspects, the techniques described herein relate to a system, wherein the plurality of datasets includes a first dataset, and wherein the first dataset includes data records collected on a date defined as 1 day previous to the current day; wherein the plurality of datasets includes a second dataset, and wherein the second dataset includes data records collected on a date defined as 14 days previous to the current day; and wherein the plurality of datasets includes a third dataset and wherein the third dataset includes data records collected on a date defined as 90 days previous to the current day.

In some aspects, the techniques described herein relate to a system, wherein the plurality of datasets and the historical data include payment transaction data.

In some aspects, the techniques described herein relate to a system, wherein the scoring produces respective fraud scores for each record of the historical data.

In some aspects, the techniques described herein relate to a system, wherein the rule is a segment rule for a segment, and wherein the segment is defined by a transaction type.

In some aspects, the techniques described herein relate to a system, wherein the segment is one of a plurality of segments, and where each of the plurality of segments is defined by a different rule type.

In some aspects, the techniques described herein relate to a system, wherein each segment of the plurality of segments includes a segment rule and wherein each segment rule includes a scaler value of which can be set independently.

In some aspects, the techniques described herein relate to a system, wherein the historical data is data collected within a predetermined time window.

In some aspects, the techniques described herein relate to a system, wherein the predetermined time window is from the date defined as 1 day previous to the current date to the date defined as 14 days previous to the current date.

In some aspects, the techniques described herein relate to a non-transitory computer readable storage medium, including instructions stored thereon for frequent machine learning model retraining and rule optimization, which when read and executed by one or more computers cause the one or more computers to perform steps including: generating a challenger machine learning model based on a production machine learning model; training the challenger machine learning model on a plurality of datasets, wherein each of the plurality of datasets includes data records collected on a date defined as a number of days previous to a current date; scoring historical data with the challenger machine learning model, wherein the scoring produces a respective score for each record of a plurality of records in the historical data; determining that the challenger model performs within predetermined thresholds based on the scoring; selecting an optimal scaler value for a rule based on execution of the rule with a range of scaler values applied to the respective score for each record of the plurality of records evaluated by the rule; determining that the optimal scaler value outperforms a production scaler value; and promoting the challenger model and the optimal scaler value to a production environment.

DETAILED DESCRIPTION

Aspects are generally related to systems and methods for frequent, machine learning model retraining and rule optimization.

In accordance with aspects, systems and methods for automated, rapid, and frequent machine learning model retraining, and for a framework for implementing a frequently retrained model that optimizes a simplified set of associated rules, are disclosed. The disclosed framework can, at a set time interval (e.g., daily), gather all data for updates, retrain a machine learning (ML) model, ensure that the retrained model meets organizational thresholds for performance, determine a best strategic approach for implementing the retrained model, and deploy the retrained model along with an optimized rule set to a production environment.

In accordance with aspects, the framework can confirm that a retrained model outperforms previous versions of the model and can determine that the retrained model does not adversely affect operations associated with output of the model (e.g., operations that depend on scoring from the retrained model, or downstream rules and/or calculations that depend on scoring from the retrained model). The framework can include functionality for retraining a model at a frequent interval (e.g., on a daily basis). After model retraining, the framework can simulate application of algorithmic rules that incorporate scores output by the model in order to determine optimizing modifications to scalars employed in the rules.

Model training data may be truncated data from a time period that captures recent historical data and that spans a sufficient time period that maturation of any terminal events in the data will be complete (e.g., truncated data from a 90-day rolling window). Simulation data may also be data from a time period that captures recent historical data (e.g., a rolling 14-day window), and that has been scored by a production model. The production model scoring may be used as a baseline for comparison with the retrained model scores in order to determine an amount of distribution shift and the resultant need for rule optimization of rules that incorporate the model's scoring or other putput.

Advantages to frequent (e.g., daily) model retraining and rule optimization include near-real time recognition/prediction of emerging patterns in recent historical data. Manual steps in model training and deployment can be eliminated, and corresponding rules can also be optimized to normalize output to business operations, thereby reducing cost and the potential scope for human error in the training and optimization process.

Figure 1:
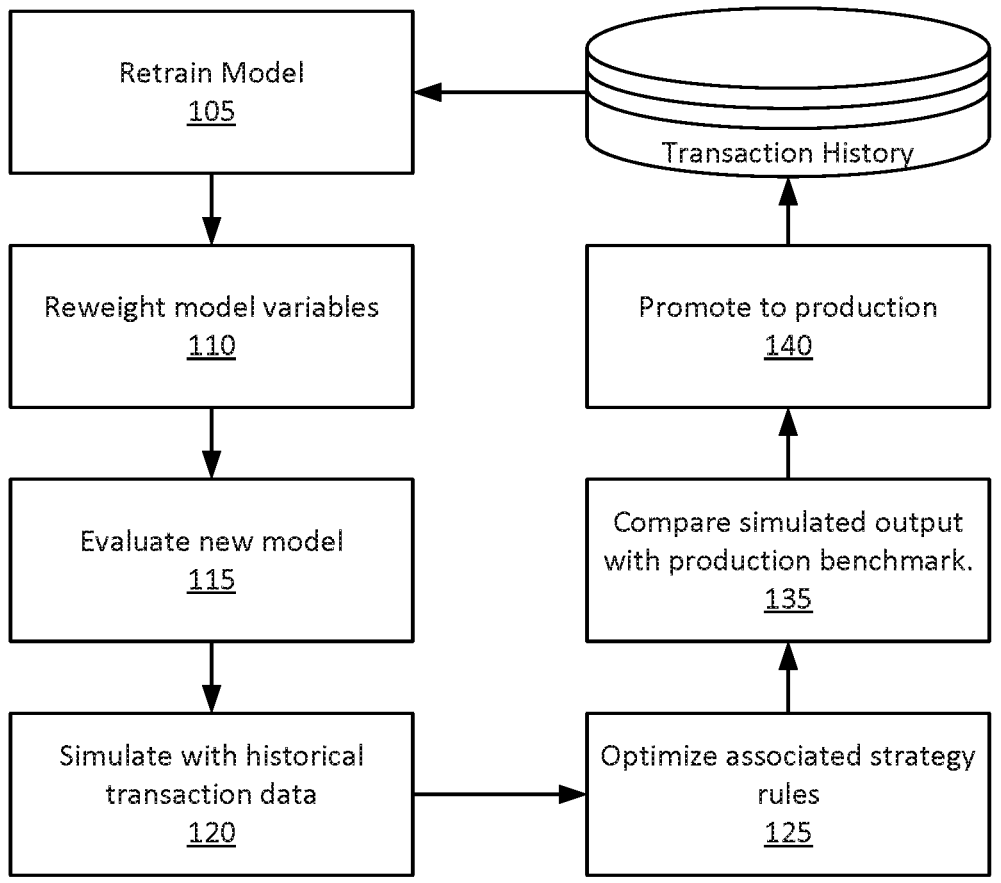
FIG. 1 is a logical flow model and rule retraining and optimization, in accordance with aspects.

FIG. 1 is a logical flow model and rule retraining and optimization, in accordance with aspects. A step 105, a production model can be retrained using the techniques discussed herein. At step 110, the model variable can be reweighted based on new patterns indicated by the retrained model. At step 115, the retrained and reweighted model can be evaluated via a health check, to determine that the retrained model is functioning within expected and acceptable constraints before proceeding further. At step 120, rule output including scores from the retrained model and adjusted rule scalers can be simulated. At step 125, the most optimized rule from each of a series of segments can be selected, and an overall optimized profit vs decline rate can be determined for the simulation. At step 135, the simulated output can be compared with a benchmark output from the production settings. At step 140, if the simulated output has a better profit vs decline rate than that of the production model and rule settings, the retrained model and optimized rules are promoted to the production environment, the newly promoted model begins scoring production data and the newly optimized rules begin processing payment transactions. From this point, the process can start over, e.g., on the next day.

Payment transaction authorization decisioning based on ML model predictions that a transaction is fraudulent is an exemplary area of analysis where shorter time intervals between retrained ML models is highly desirable. Fraud actors attempt to take advantage of the long ML model re-training window to alter fraudulent activity so that a stale model will not detect illegitimate transactions. The present disclosure may describe aspects in the context of payment transaction authorization decisioning, but such context is exemplary, and not meant to be limiting. Aspects disclosed herein are applicable to any field that would benefit from rapid and frequent retraining of ML models and optimization of corresponding rules.

Payment products, such as credit cards and debit cards, that are issued by a financial organization are ubiquitous in today's payment transaction economy. Because the issuer is often liable for fraudulent transactions made with the payment product, issuer's have developed fraud detection techniques to curb fraudulent transactions and thereby limit liability. Conventionally these fraud detection techniques are rules-based techniques, where the rules are manually developed based on historic fraud trends. A conventional rules-based system for detecting payment transaction fraud can employ thousands of rules to cover numerous permutations of transaction types, customer segments, varying levels of fraud risk, and transaction dollar amounts, which categorize transactions into similar risk groups. Such rules based on complex conditions of transactions, however, are very difficult to maintain and update. This can result in slow responses to rapidly changing fraud-risk patterns.

Aspects can include a simplified rule structure for detecting a fraudulent transaction based on a ML model score of the transaction and assigning a return on investment (ROI) value to the transaction based on variables associated with the transaction. Transaction parameters/variables relevant to ROI can include an embedded transaction type, a customer segment and a transaction dollar amount, among others. This can be paired with a fraud score for the transaction generated by a ML fraud model that provides an accurate point estimate of fraud probability. Results can include improved fraud loss mitigation, an optimized transaction-decline volume allocation, an increase in rule maintenance efficiency, easily adopted and frequently updated fraud risk scores, and a reduction in computer processing power and technology infrastructure requirements dedicated to fraud prevention.

Decision making strategies regarding declining a transaction that is made via an electronic payment network with a payment product issued by a financial, or financial-technology (FinTech), organization, and that is predicted to be fraudulent, can include an analysis of both the benefit and the cost of declining the transaction. Benefits include potential net fraud loss saved, recovery cost reduction, and claim handling cost reduction. Costs include operational costs, such as customer contacts and human handling of fraud cases, and losses in interchange revenue and sales. This reflects an overall transactional return on investment concept.

Figure 9:
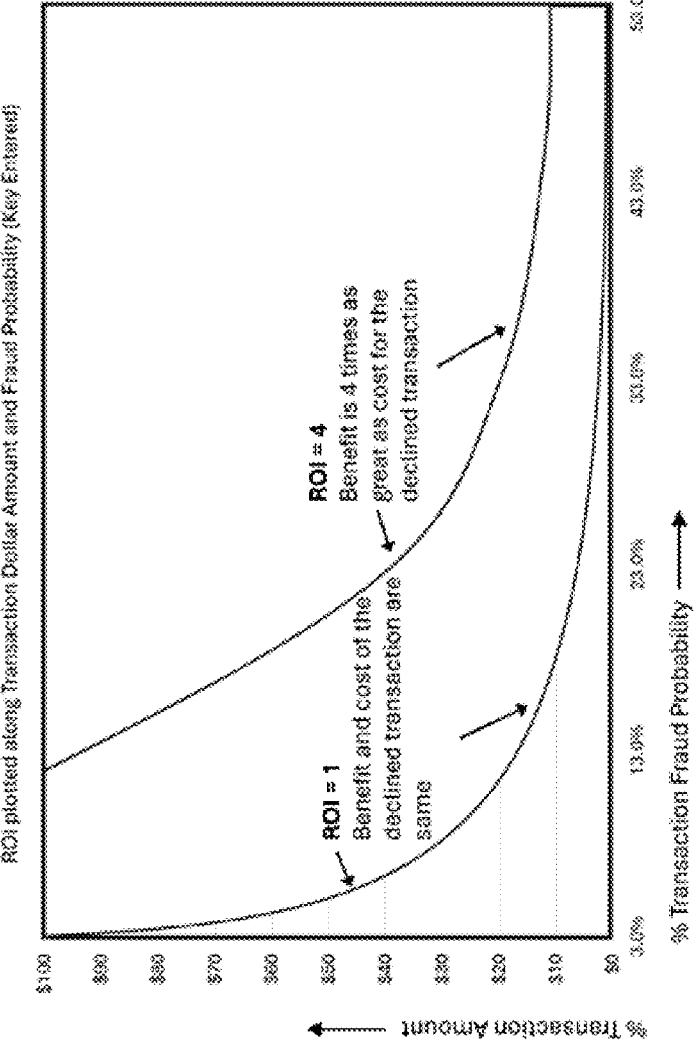
FIG. 9 is a table of a return on investment (ROI) curve, indicating a benefit and cost of declining a transaction, according to certain aspects of the present disclosure.

These benefits and costs can be combined with a transaction's fraud score from a trained ML model to arrive at a probabilistic return on investment (or "return on decline") for a declined transaction. Return on investment (ROI) curves can be a function of the transaction dollar amount as well as the transaction's probability of fraud as determined by a ML algorithm output. Thus, the ROI for a declined transaction can be different for a given transaction type, customer segment, dollar amount, and fraud probability. FIG. 9 shows an ROI curve having a value of 1, indicating the benefit and cost of declining the corresponding transaction is equal. FIG. 9 further shows an ROI curve having a value of 4, indicating that the benefit of declining a transaction is 4 times as great as the cost of the declined transaction. These techniques can be incorporated by organizations in a transaction authorization decision flow in order to rapidly and efficiently determine whether a transaction should be declined as fraudulent.

An exemplary simplified rule structure for transaction authorization decisioning can be based on a score produced by a ML model and an ROI. For instance, a rule may include logic that states if a payment transaction is assigned a 10% fraud score by a ML model (i.e., the model predicts the payment transaction is fraudulent 10% of the time) and the ROI is greater than 2, then the payment transaction should be declined. While this example rule is greatly simplified relevant to traditional fraud detection rule structures, its reliance on a ML model fraud score may leave the structure vulnerable to emerging payment fraud trends if the associated ML model is not regularly and frequently retrained.

In accordance with aspects, a ML model retraining framework and technique can utilize survival analysis to predict the distribution of both a fraud tagging label and a waiting time until the fraud tagging event (i.e., the fraud maturation time). The model development dataset can be in the form of $(x, Y, T)$, where $x$=model input, $Y$=model target, and $T$=waiting time until a fraud tagging event. The base model can utilize a logistic regression technique (e.g., a RuleFit model) with the variables derived from a distributed Extreme Gradient Boosting algorithm (XG Boost) together with an online learning algorithm to enable more frequent (daily) model updates. While the model and model training are discussed in the context of payment transaction fraud detection, this is not meant to be limiting and other target variables (e.g., application fraud, balance transfer fraud and others inside and outside the financial services sector) may be used to develop and train the model.

A fraudulent payment transaction may not be confirmed as fraudulent for a length of time after the transaction is made. This time window between the execution of a fraudulent transaction and a confirmation that the transaction was fraudulent can be termed "fraud maturity." Fraud maturity can be different for different types of transactions. In some cases, a transaction can be rapidly tagged as fraudulent (e.g., by a payment product issuer), and quickly confirmed as fraudulent by the valid user of the payment product (e.g., the customer the payment product was issued to). In such a case, the fraud maturity can be less than one day—it may be a matter of hours or minutes. In other cases, fraud maturity can take much longer.

Statistically, all fraudulent transactions can be assumed to be mature (i.e., identified and confirmed) at the end of a 90-day window. That is, an organization can assume that (statistically) all fraudulent transactions (e.g., 99.9%) will be identified and confirmed within 90 days of the transaction's execution. Thus, for purposes of modeling, it can be said that fraud maturity is 90 days. Accordingly, in order to train an unbiased model, a 90-day window of transactions, which includes all fraudulent transactions being confirmed and tagged as fraud, would be required using conventional modeling techniques. Retraining of a ML model every 90 days, however, would not effectively detect emerging payment fraud patterns, and training a model everyday day, on a rolling basis, with 90 days of historical data would not be feasible in terms of time or resources. Moreover, such a training technique would mix mature and immature fraud blindly, thus underestimating the probability for fraud with respect to more recent transactions.

In accordance with aspects, a survival model can be used in conjunction with survival analysis in, e.g., fraud modeling to enable unbiased learning from recent data that may be missing data tags (e.g., fraud confirmation tags) due to an incomplete maturity window. Survival analysis is useful for analyzing datasets that may include censored data having a waiting time until a terminal event. For example, a transaction dataset that spans a timeframe less than a fraud maturity window, will have some transactions tagged as fraudulent. There will be other transactions, however, that will later be tagged as fraudulent but that are not so tagged in the dataset due to the dataset being collected over a shorter time frame than the fraud maturation time frame. Thus, using survival analysis, a model can be trained on a dataset prior to all fraudulent transactions in a recent dataset being tagged as such. Using survival analysis, bias in a dataset collected over a timeframe that is shorter than fraud maturation can be removed from immature fraud tags by predicting the probability that a transaction will eventually be tagged as fraudulent.

An issue arises when using survival analysis in payment fraud transaction analysis, however, due to the conventional number of models required to perform the analysis frequently (e.g., daily). For instance, conventionally, a model for each discrete timeframe under evaluation in a survival analysis would be generated in order to generate a probability that, e.g., a transaction would be fraudulent. That is, in a fraud detection scheme with a goal of daily model retraining, a model can be created for each day of the 90-day fraud maturation window. Each day's model would produce a probability that an executed transaction would be tagged (e.g., over the fraud maturation period—the next 90 days) as fraud. The probabilities produced by the last 90 models (which predict probabilities of fraudulent transactions over the last 90 days based on censored data) can then be used in a conditional probability calculation formula to arrive at a final fraud probability that a transaction executed in real time will be confirmed as fraudulent over the next 90 days. That is, a wholistic probability can be arrived at (e.g., via a Bayesian Rule) that estimates the likelihood that a real-time transaction will be confirmed as fraudulent over the next 90 days. While this technique can effectively produce unbiased results with respect to more recent training data, exposing a real-time transaction to 90 models would not produce a fraud score for the transaction in an acceptable timeframe for authorizing a transaction (e.g., on the order of several hundred milliseconds). Moreover, as noted above, maintaining and updating 90 ML models on a daily basis is not feasible.

In accordance with aspects, in order to reduce the number of models in a survival analysis, historical data can be truncated into sets that are representative of larger time frames, and these truncated sets can be analyzed and modeled using survival analysis. For example, a dataset including a 90-day interval of transactions can be truncated into transactions from the previous day (or the most recent transaction data records; i.e., a short-term dataset, "T-1"), transactions from the day that was two weeks prior (i.e., a mid-term dataset, "T-14"), and transactions from the day that was 90 days prior (i.e., a long-term dataset, "T-90") from the current production day. To estimate the short-term fraud probability, $P\_1=P(T\in[0,2])$, an unbiased dataset can be generated with the condition age≥2 to predict event $T\in[0,2]$. To estimate the mid-term fraud probability, $P\_2-P(T\in[3,14]$ |T>2), an unbiased dataset can be generated with the condition age≥14 and T>2 to predict event $T\in[3,14]$. To estimate the long-term fraud probability, $P\_3=P(T\in[15,90]$ |T>14), an unbiased dataset can be generated with the condition age≥90 and T>14 to predict event $T\in[15,90]$. Using truncated data, a smaller number of models can be built, but an equivalent estimation of fraud probability can be made using the smaller number of models. In the example above, only 3 models would be needed to model the truncated time frames. Each model is then trained on transactions having different fraud maturation time windows. As each day rolls over, the T-1, T-14, and T-90 transaction datasets also roll over to a new set of historical transactions that were executed and captured on the respective days indicated by subtracting the noted number of days from the current day. Each baseline model (e.g., model T1, model T2, and model T3) can then be exposed to and re-trained on, the data from the appropriate day to update each model.

Incremental data features used in survival analysis of payment transaction fraud can include both new transaction data and new fraud tagging data. The new transaction data can include the previous day's production data. The new fraud data, however, can be linked to a transaction date that may be any date from the past 90 days since fraud maturation is considered to be 90 days. Accordingly, the incremental transaction volume and the incremental fraud-tagged transaction volume can be exposed to a model on a daily basis for daily re-training of the model.

In accordance with aspects, a reduced number of models in a survival analysis (e.g., the three models noted above) can be further reduced to a single model using datasets that would otherwise be used to train disparate models on data representing different time windows. That is, given a number of datasets representative of respective time intervals (e.g., datasets for T-1, T-14, and T-90, as discussed above), a single dataset can be generated by combining the time interval datasets, and a single model can be trained using the combined datasets. A single model further reduces model training time, which, in turn, facilitates a highly achievable and practical frequent-retraining (e.g., daily retraining) procedure To further simplify a frequent retraining procedure to train a single model, model developers may use a segmentation combining technique by combining datasets and adding an additional segmentation variable (e.g., a window to indicate the partition time window j=1,2,3). For instance, given three datasets (as discussed, above) $D_1=\{(X_1, Y_1)\}$ with $P(Y_1=1|X_1=x)=P_1(x)$, $D_2=\{(X_2, Y_2)\}$ with $P(Y_2=1|X_2=x)=P_2(x)$, and $D_3=\{(X_3, Y_3)\}$ with $P(Y_3=1|X_3=x)=P_3(x)$. The datasets can be combined as expressed in $D=\{(X, J,Y)\}$, where J is an additional predictor indicating the datasets. The conditional probability then becomes $P(Y=1|X=x,J=j)$, which is equal to $P_j(x)$. Accordingly, the three-probability estimation problem from $(X, Y) \rightarrow P_j (Y=1|X)$ can become one probability estimation problem: $(X,j,Y) \rightarrow P(Y=1|X,j)$.

In accordance with aspects, variables of a retrained model can be reweighted in order to reflect emerging trends indicated in the modeled dataset(s). For instance, with respect to payment transaction fraud, based on recent fraud data and existing trees, variable weights can be shifted to provide more weight to a tree split that has been tagged as fraud more in recent timeframes. That is weighting is redistributed among variable features based on trees that have seen an increase in fraudulent activity. Further, a curve that also weights more recent trends heavier than trends indicated in earlier timeframes can be applied. That is, a recency bias for fraud forming patterns more recently can be applied, such that trends formed on the distant end of the data interval are not ignored, but that trends on the more recent end are given more weight.

Figure 2:
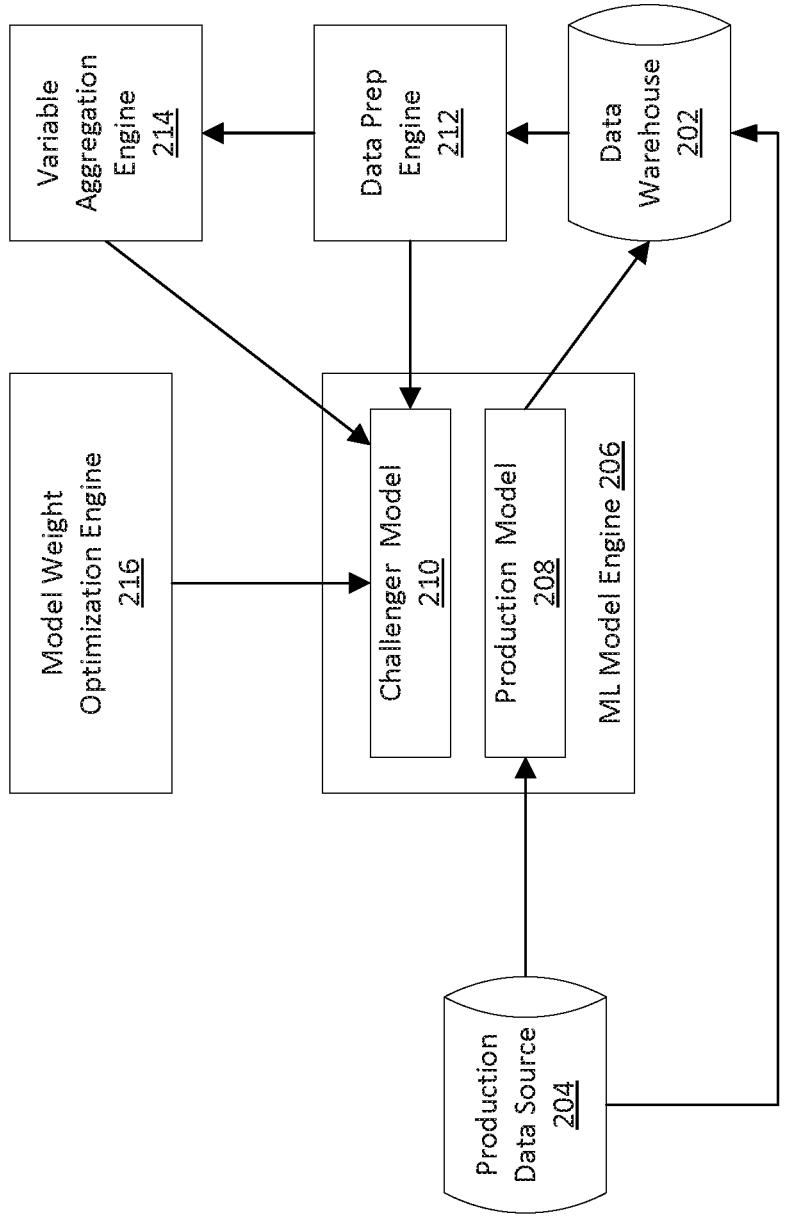
FIG. 2 is a block diagram of a system for frequent model retraining, in accordance with aspects.

FIG. 2 is a block diagram of a system for frequent model retraining, in accordance with aspects. FIG. 2 includes data warehouse 202, production data source 204, and ML model engine 206, which includes production model 208 and challenger model 210. FIG. 2 further includes data prep engine 212, variable aggregation engine 214, and model weight optimization engine 216.

Production data source 204 may be any source of production transactions. For example, in the case of payment transaction fraud detection operations, production data source 204 may be streaming data from a payment network. Production data source 204 can pass data to production model 208 for scoring (e.g., fraud scoring). Production data source 204 can also log all incoming data in data warehouse 202, where it will be persisted as historical data. After scoring incoming data, production model 208 may store scores in data warehouse 202 with corresponding data. For instance, production model 208 may associate a fraud score with a corresponding transaction in data warehouse 202. Data warehouse 202 can be any suitable data store.

Data warehouse 202 may store other related data as well. For instance, data warehouse 202 may receive fraud tags (i.e., confirmation that a stored transaction is fraud), associate the fraud tag with a corresponding transaction, and persist the fraud tag.

ML model engine 206 may also include challenger model 210. Challenger model 210 may be a model that is based on production model 208. Challenger model 210 can be a copy of production model 208, or it may be derived from production model 208. Challenger model 210 can be (re) trained using the techniques described herein. Challenger model 210 can be trained on historical data stored in data warehouse 202. Data prep engine 212 can prepare the historical data to be exposed to challenger model 210 for training. Further, variable aggregation engine 214 can aggregate variables needed for challenger model 210 prior to retraining with historical data prepared by data prep engine 212. Model weight optimization engine 216 can reweight variables of challenger model 210 to reflect emerging trends indicated in the modeled dataset(s).

Figure 3:
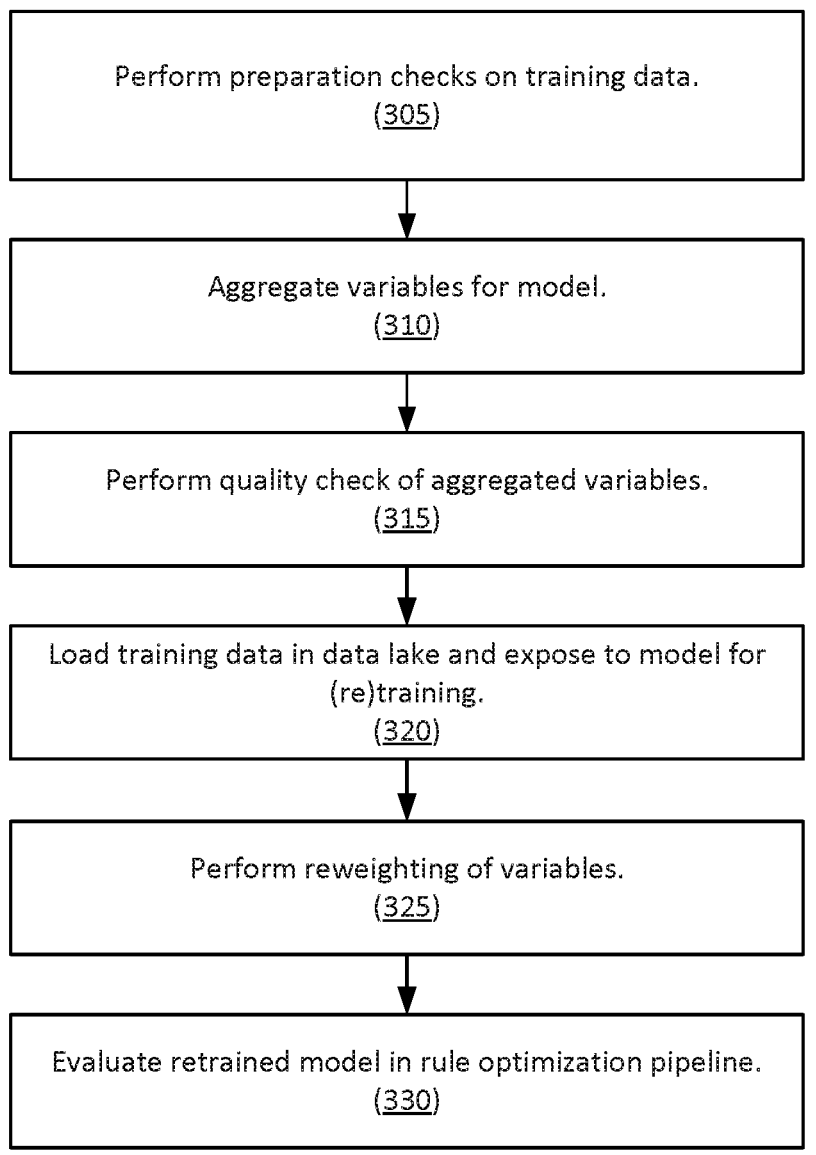
FIG. 3 is a logical flow for daily retraining of a ML model, in accordance with aspects.

FIG. 3 is a logical flow for daily retraining of a ML model, in accordance with aspects. At step 305, preparation checks on the latest collected time-window transaction data and fraud-tagged data (i.e., T-1, T-14, and T-90 data, as discussed above) can be executed. Data that will be included in a training dataset may come from a variety of data stores. For example, data may be retrieved from a data warehouse, tables in a relational database, etc. Preventative checks on the data can include checking that record counts are accurate, and that all data records are sourced with the proper data (e.g., the correct historical data), and that the tables include appropriate data (e.g., there are no empty or null fields).

At step 310, all variables needed to build the model, along with the daily incremental training population (T-1; T-14; T-90 data), are aggregated. Variables are represented as nodes in a model's trees. Variables are inputs to the model, and the model maps the numerous variables to an aggregated and weighted outcome. Many variables (in some cases, thousands) can be considered and utilized in model development. Model variables can include conditions such as transaction type, customer segment, transaction dollar amount, etc. Other examples of variables that can be used in a ML model include raw information that comes on a payment transaction from payment networks, aggregated customer/merchant profiles from historical data, cross channel data from other related products, etc. Model variables route model input (e.g., a payment transaction) to a weighted outcome. A string of variables is, collectively, a tree, and a tree may be further divided into tree splits. The model may build thousands of trees based on the aggregated variables. Each tree split can be weighted based on its percentage of correct predictions to produce a weighted average.

A quality check of the data with respect to the variables as well as the daily incremental training population for the challenger model can be performed at step 315. This quality check can be compared to a known baseline and can indicate that the variables and training population data have been aggregated correctly. For example, a check may be made on a fraud rate of a large population (e.g., the entire population of the United States), where the rate should remain relatively consistent. If the quality check is high, or low, a flag can be thrown, and the process can be terminated. Variable quality checks can be made with prepared historical data against historical thresholds with expected bounds and are made to provide alerts that variables have not been properly aggregated or data is incomplete or compromised in some way. A quality check is performed early in the retraining process.

At step 320, the prepared data can be loaded into a table in a data lake, such as Apache Cassandra®, and exposed to the model for training/retraining. Thereafter, the newly retrained model can be encoded and is ready to be tested in a simulation with historical data and applicable rules.

At step 325, reweighting of the model trees takes place based on the freshly encoded transaction and fraud tagging data. In accordance with aspects, if it is assumed that a model can be parameterized with $\theta$ and the loss function is $L(\theta)$, then a model can be trained by minimizing the loss $L_D(\theta)$ on the existing dataset D. Suppose the minimizer is $\theta_0$. Given an incremental dataset I, the batch method is to train the model on $D \cup I$, i.e. minimizing $L_D(\theta)+L_1(\theta)$. A batch update using this methodology is computationally expensive, however. In other aspects, reweighting can start from the existing minimizer $\theta_0$, and replace the objective function with a second order approximation:

$$\frac{1}{2}(\theta - \theta_0)^t H_D(\theta_0)(\theta - \theta_0) + \rho L_I(\theta),$$

where $H_D(\theta_0)$ is the Hessian matrix for $L_D(\theta)$ at $\theta_0$. a weight $\rho$ to balance the impact of recent data and existing data can be provided.

The calculation of the Hessian matrix is still computationally expensive, however, and a simplified computation for frequent reweighting of the variable/training data is desirable. Accordingly, in yet another aspect that can further simplify the computation, the Hessian matrix can be replaced with its diagonal elements $\Lambda_D(\theta_0)$, which can be approximated using incremental data $\Lambda_I(\theta_0)$ to avoid revisiting existing data. The objective function then becomes $$\frac{1}{2}(\theta - \theta_0)^t \Lambda_I(\theta_0)(\theta - \theta_0) + \rho L_I(\theta),$$

which can be optimized using only the incremental data. Applying the same method to the second term, the next step of the updating formula can approximate the online Gradient descent method with an adaptive learning rate. This objective function can be minimized directly using a second-order quasi-Newton method, LBFGS. Additionally, $I_1$ and $I_2$ penalty terms can be added to stabilize the convergence and to encourage the sparsity of the solution. The final reweighting algorithm may be given by:

$$\theta_{new} =$$

$$\text{argmin}_\theta \left\{ \frac{1}{2}(\theta - \theta_0)^t \Lambda_I(\theta_0)(\theta - \theta_0) + \rho L_I(\theta) + \lambda \left( \alpha |\theta|_1 + \frac{1}{2}(1 - \alpha)|\theta|_2^2 \right) \right\}.$$

At step 330, the retrained and reweighted model can be sent for evaluation in a rule optimization pipeline. This step includes simulation of the retrained model's transaction scores with a rule scheme, such as an ROI rule scheme, as discussed herein.

Figure 4:
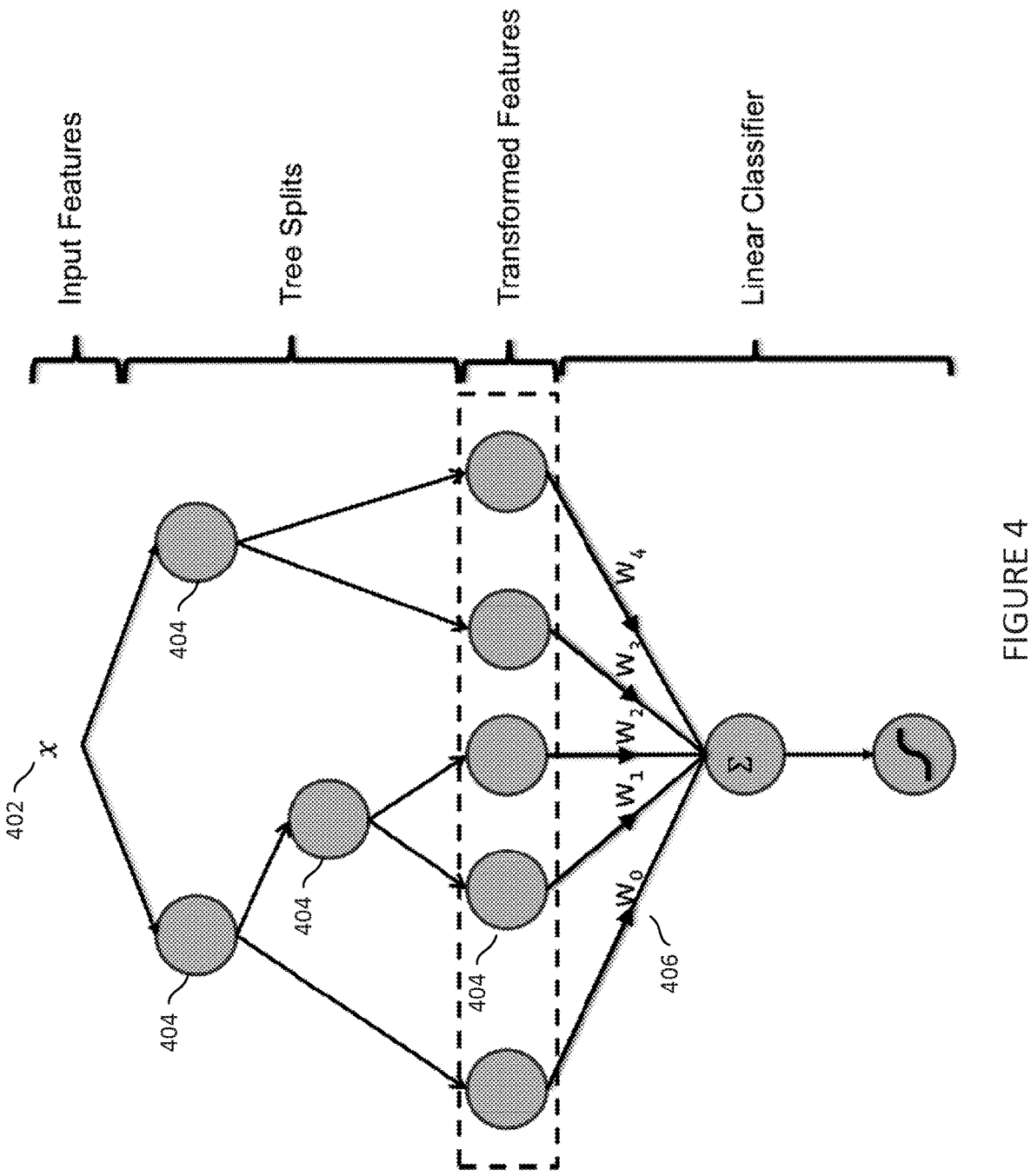
FIG. 4 is a diagram of a model tree, in accordance with aspects.

FIG. 4 is a diagram of a model tree, in accordance with aspects. Input feature 402 are model input such as transactions from a payment network. Variables 404 are conditions related to input features, such as transaction type, customer segment, transaction dollar amount, etc. Input feature 402 can be routed based on conditions through tree spits of variables 404 to a weighted outcome. Based on retraining of the associated model, model weights 406 can be redistributed to reflect emerging trends indicated in the modeled dataset(s).

While frequently retraining a ML model can provide insight to emerging patterns and trends, it can also have downstream impacts that make implementation of a frequently retrained model challenging. For instance, for a given model a distribution shift of model output may occur after the model is retrained with fresh data. Accordingly, it is often necessary or advantageous to adjust a retrained model's output, a downstream rule that incorporates the model's output, or both, in order to normalize model and rule output. Rules are discussed herein in the context of ROI-based fraud tagging and decisioning, but rules can be any function or logic that is used downstream from the model and incorporates model output directly or indirectly.

For instance, the exemplary ROI rule provided above may need to be adjusted after model retraining due to a distribution shift in the output of the newly trained model. Emerging trends identified by the retrained and reweighted model may indicate that similarly categorized transactions now should be declined with an 8% fraud score and an ROI greater than 2.5 (as opposed to, e.g., the previous day's configuration of declining these transactions with a 10% fraud score and an ROI of 2). However, even a greatly simplified rule structure of a decisioning engine may have more rules than can practically, or even possibly, be manually updated on a regular and short interval, such as daily.

Moreover, a rule set's determinations or other downstream determinations, or model scores output by a retrained may need to be normalized after a distribution shift so that business operations whose function is based on model and rule output is not overwhelmed or underwhelmed. For example, if a distribution shift of a ML model's output causes a fraud detection rule engine to decline significantly more transactions then a previous version of the model, the operational servicing associated with declining the transactions may become unmanageable. Conversely, if a distribution shift that causes significantly less declined transactions is also not desirable to a payment product issuer. Thus, while a retrained model that can detect emerging trends is desirable, drastic changes to operations that may be caused by retrained models may not be tolerable, and a highly efficient process for optimizing retrained model output and rule output is needed.

In accordance with aspects, a rule engine can be configured to automate rule optimization after a model retraining event using a system of dials and scalers. A scaler is a multiplier applied to a model score, and a dial is an optimization function that determines and sets the value of a scaler. In the context of payment transaction authorization rules where a rule incorporates a fraud score from a fraud ML model and an ROI value to produce an ROI score, a rule optimization engine can include a scaler for the model's fraud score and a scaler for the ROI value. By manipulating the value of the scalers, the model fraud score and the determined ROI value can be adjusted (up or down), which, in turn, can adjust the ROI score (which includes the fraud score and the ROI value in its calculation) for an optimal and normalized output. A dial may determine an appropriate value of a scaler based on a distribution shift of a retrained model as compared to the distribution of a previous production model. Further, scalers may be adjusted based on operational norms of acceptable rule output. Accordingly, the dynamic adjustment of scalers to normalize model scores after retraining of the model prevents manual adjustment of each rule and allows a frequently retrained model to be effectively implemented in a production environment.

Figure 5:
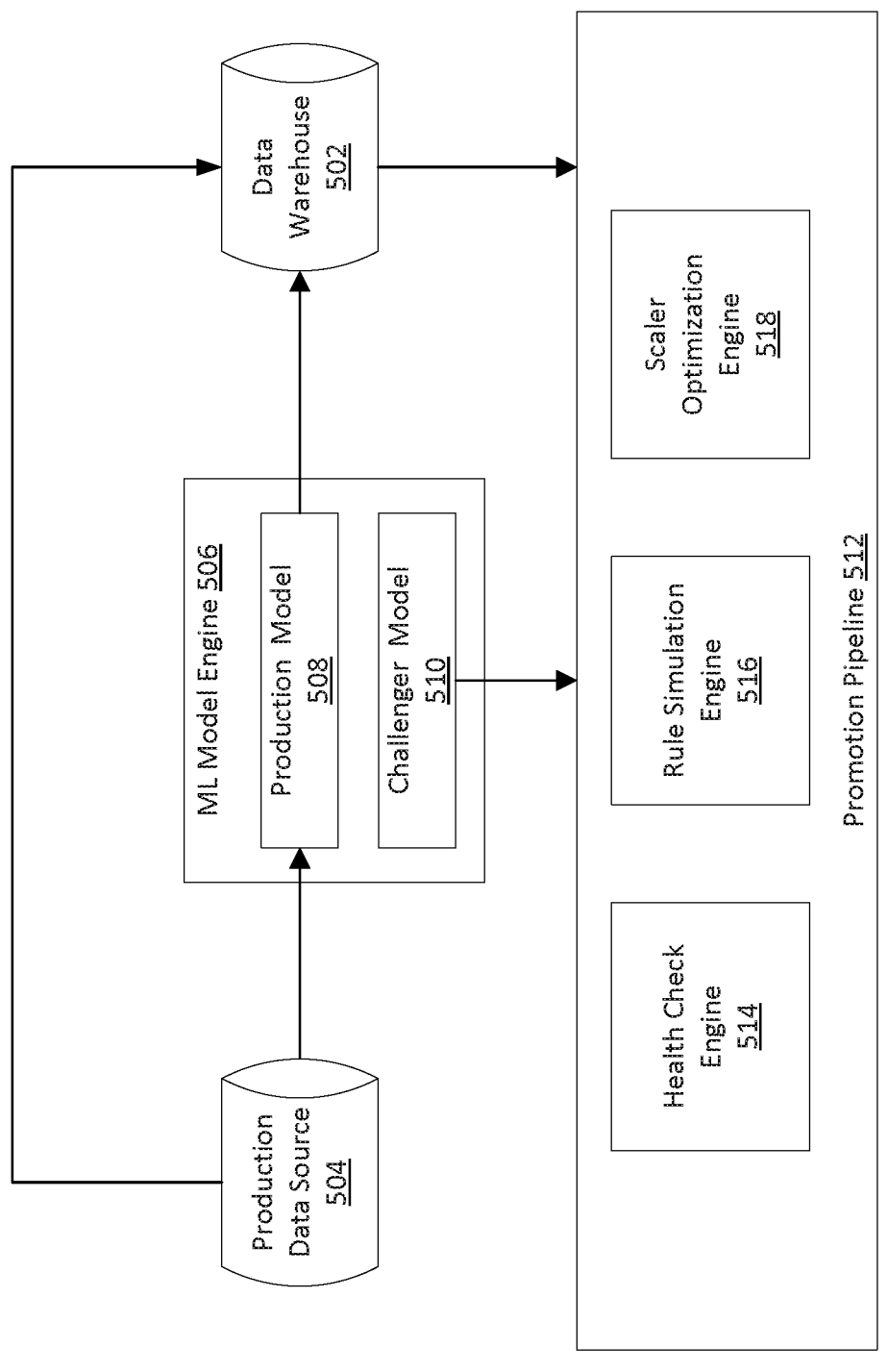
FIG. 5 is a block diagram of a system for rule optimization and promotion, in accordance with aspects.

FIG. 5 is a block diagram of a system for rule optimization and promotion, in accordance with aspects. FIG. 5 includes data warehouse 502, production data source 504, and ML model engine 506. ML model engine 506 include production model 508 and challenger model 510. FIG. 5 further includes promotion pipeline 512, which includes health check engine 514, rule simulation engine 516, and scaler optimization engine 518.

In accordance with aspects, challenger model 510 is a retrained and reweighted model that is based on production model 508. Promotion pipeline 512 may retrieve a historical dataset from data warehouse 502. The historical dataset may be from a time window, e.g., a 14-day time window. Health check engine 514 can be configured to verify challenger model 510 through a health check process. Health check engine 514 may execute challenger model 510 using the historical data, or a sampling thereof. Challenger model 510 may score the historical data and health check engine 514 may compare the scores from challenger model 510 with production scores for the historical data made by production model 508. Details of the health check process are discussed in more detail, below. If challenger model 510 passes the initial health check the promotion pipeline can continue. If challenger model 510 fails the initial health check, then the promotion can be terminated.

If challenger model 510 passes the initial health check, then rule simulation engine 516 can use the historical data, including historical transactions and fraud scores produces by challenger model 510 for the historical transactions, and simulate rule output options. That is, rule simulation engine 516 can produce a rule output option for each rule, where each transaction is process through a rule with several scaler values from a range of scaler values for each of the fraud score scaler and the ROI value scaler. The outcomes of these simulations are stored in a data frame for the optimization step. Rule simulation is discussed in more detail, below.

Once the rule simulation is complete, scaler optimization engine 518 can determine, based on the population of rule outputs across different segments, an optimized scaler setting for each segment. Scaler optimization engine 518 can then determine an overall profit vs decline rate of the optimized rules. If the profit vs decline rate is better than the profit vs decline rate of the current production model and rule configurations, then the retrained model and selected optimal scaler values can be promoted to the production environment to and begin to process data from production data source 504. If, however, the overall profit vs decline rate of the optimized rules is not better than that produced by production model 508, then the promotion process can terminate, and production model 508 can remain in a production role. The rule optimization process is discussed in more detail, below.

In accordance with aspects, after a ML model is retrained, a model promotion pipeline can verify the retrained model against the existing production model to determine whether the performance of the retrained model is equal to or better than the current production model. If it is determined that the retrained model performs as well as, or better than the current production model, then the retrained model can be promoted to the production model and the previous production model can be retired. If, however, it is determined that the retrained model performs less optimally than the current production model, then the retrained model can be discarded and the current production model can remain in the production environment. This can be referred to as a "champion/challenger" scheme for model promotion, where the production model is the champion, and the freshly retrained model is the challenger.

In accordance with aspects, a health check engine can be configured to execute a challenger model and provide historical data to the model to be scored by the retrained challenger model. The resultant scores can be used to determine the health of the retrained model and its aptitude for a production role. A time window of historical data can be retrieved from a data store and scored with the retrained model. For example, a 14-day window of historical data may be input to the retrained model for scoring. The same 14-day window will have been scored by production models (either the current production model or a predecessor of the current production model). Using the production scores and the scores produced by the retrained model, an initial health check can be performed to determine, at a high level, whether the model will be submitted for more rigorous testing in a promotion scheme. Because more rigorous model testing is resource intensive from a technology resource perspective, an initial health check with respect to fundamental qualities of a retrained model can quickly and inexpensively (from a technology resource perspective) rule out sub-optimal models that may be produced by the retraining process.

Aspects of an initial model health check can include a determination that a distribution shift of the retrained model's scores does not exceed a predetermined threshold. For example, an initial health check function can include distribution analysis by checking percentile thresholds and/or utilizing the Jenson Shannon Divergence test. If either test produces results outside of expectations, the health check can be deemed failed. Another aspect can include a determination that predictive outcomes for the dataset has not shifted dramatically (e.g., for payment transaction data, that a rate of fraud detection has not dropped or risen past a threshold). For instance, where payment transactions are being scored for fraud, weighted "Compare Transaction Decline Rate" and "Volume Decline Rate" (TDR/VDR) checks for validity and performance may be performed. The TDR/VDR at 25 and 50 basis point thresholds can be compared to previous production model scores, and if the overall population is out of predetermined bounds, the health check can be deemed failed. If the retrained model passes the initial health check, it can be submitted for more rigorous testing in the promotion pipeline. If, however, the retrained model fails any or all of the initial checks, then the retrained model can be discarded and the current production model can be retained for production use.

In accordance with aspects, after a retrained model passes an initial health check, a rule simulation engine can be configured to simulate the outcome of a historical transaction with respect to a rules scheme that incorporates model output. This may also be part of a model promotion pipeline. After retraining of a production model and after initial health checks have been passed by the retrained model, model scores for a window of historical data produced by the retrained model can be used to process a historical transaction with a current rules scheme.

As noted, above, a window of transaction data (e.g., 14 days of transaction data) can be retrieved from a data. The data may be sampled as, e.g., 5% in order to reduce the size of the dataset. The historical data can be used as input to the retrained model and the model can output a fraud score for each historical transaction. The output fraud score from the retrained model can then be substituted, in a rule simulation engine, for the production fraud score that was produced by the production ML model in an appropriate rule, and a hypothetical ROI score can be produced based on the substitution of the fraud score from the retrained model into the rule. This flow can be a single iteration of logic included in the simulation engine.

In accordance with aspects, in order to produce a rule output population on which to base scaler optimization, the rules engine can iterate through each transaction in the historical dataset, using the new fraud score from the retrained ML model, and simulate each rule over a range of scaler values. That is, for each rule that would be applied to a transaction in a production environment, a rule simulation engine can substitute a new fraud score from a retrained and reweighted model and execute the rule iteratively substituting a scaler value from a range of scaler values for the fraud score scaler and the ROI value scaler. This can result in a rule output population of millions of ROI scores across all segments of rules.

Rules can be organized into dial segments, where each dial segment represents a certain type of transaction. Different dial segments may have different tolerances, defined by a business organization, on transactions that the business is will to decline. For instance, some exemplary dial segments that may be defined in payment transaction fraud detection environment include a "chip-on-chip" segment, a "key+internet" segment, a "key-on-chip" segment, an "other-card-present" segment, etc. A chip-on-chip may represent a transaction where the card is present and is read by a card reader. This may represent the most secure segment of transactions. A key+internet segment may reflect any card-not-present transaction. This may be slightly less secure than a chip-on-chip transaction type. A key-on-chip segment may indicate that the customer is present, but that the card is not read by a card reader and may have its own risk factor applied. The other-card-present may be a catch-all segment where transaction types not covered by other dial segments are routed. These segments are exemplary, and more, less, and/or different dial segments may be utilized in practice.

Figure 6:
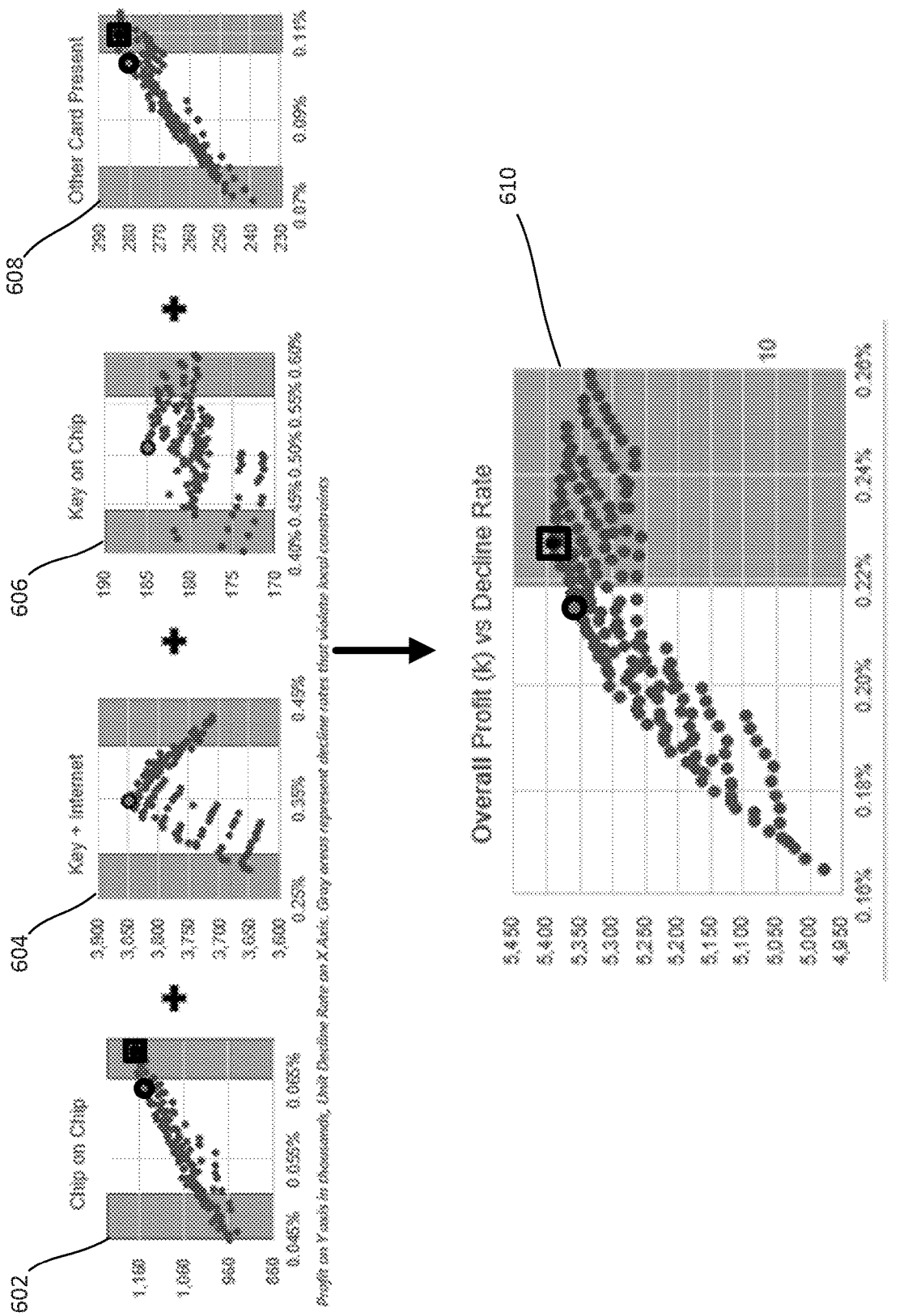
FIG. 6 depicts a series of simulated rule output populations over different dial segments, in accordance with aspects.

FIG. 6 depicts a series of simulated rule output populations over different dial segments, in accordance with aspects. FIG. 6 includes simulated rule outputs for chip-on-chip segment 602, key+internet segment 604, key-on-chip segment 606, and other-card-present segment 608. Each dot in each chart represents the output of a variation of a rule using a fraud score produced by a retrained model and having a different scaler value for the fraud score scaler and/or the ROI value scaler. That is, each simulated rule in a rules scheme includes an output where the value of the scaler for the fraud score (from a retrained model) is X, and where the value of the scaler for the ROI value is Y, and where X and Y are taken from a predefined range of scaler values, to produce the output populations seen in the charts of FIG. 6.

In accordance with aspects, after a rule simulation engine has simulated rule output as described, above, a scaler optimization engine can determine the optimal value for the scaler settings for the various rule. That is, from among all of the rule outputs, the scaler optimization engine determines the scaler settings that produces the optimal transaction decline rate and the most profit for a given rule. Considerations include, for a given set of scaler settings, how many transactions would be declined, how much fraud would be detected/prevented, and net profit for any combination of scaler settings. After determining the most optimal settings for the scaler values of all rules, the scaler optimization engine can promote these settings to the production rules, and the model promotion pipeline can promote the retrained model to the production environment.

With further reference to FIG. 6, the X axis of the segment charts of FIG. 6 show a payment transaction decline rate in percentage points, and the Y axis shows return, or profit. The shaded areas on the left and right sides of each chart in FIG. 6 represent areas of constraint. These may reflect business and operational constraints, or other types of constraints. The scaler values for rule outputs that fall within these constraints are not considered (i.e., they are immediately discarded by the rule optimization engine). Output options that fall within acceptable bounds are then each considered by the rule optimization engine according to the profit versus decline rate of each output. In accordance with aspects, the rule that produces the highest amount of net profit with the lowest amount of declines can be selected by the rule optimization engine as the most optimized rule for a given segment.

The rule output options having the dark circles around them on the various charts of FIG. 6 represent the optimal output option that falls within the predetermined constraints. Output options having heavy square boxes around them indicate an optimal output option that does not lie within the predetermined constraints (and therefore is not considered for promotion).

In accordance with aspects, a rule optimization engine can determine the optimal scaler settings for rules in each segment of a rules scheme, and can then, based in the determined optimized settings for each segment, determine the overall profit versus decline rate for all segments of the rules scheme. Summary chart 610 shows the overall profit vs decline rate of all combined segments in the rule scheme. The overall profit vs decline rate produced by the rule optimization engine can be compared to the overall profit vs decline rate of the current production model. Depending on which rate is more profitable, the retrained and reweighted model and the optimized rule scalers can be promoted to the production environment.

Figure 7:
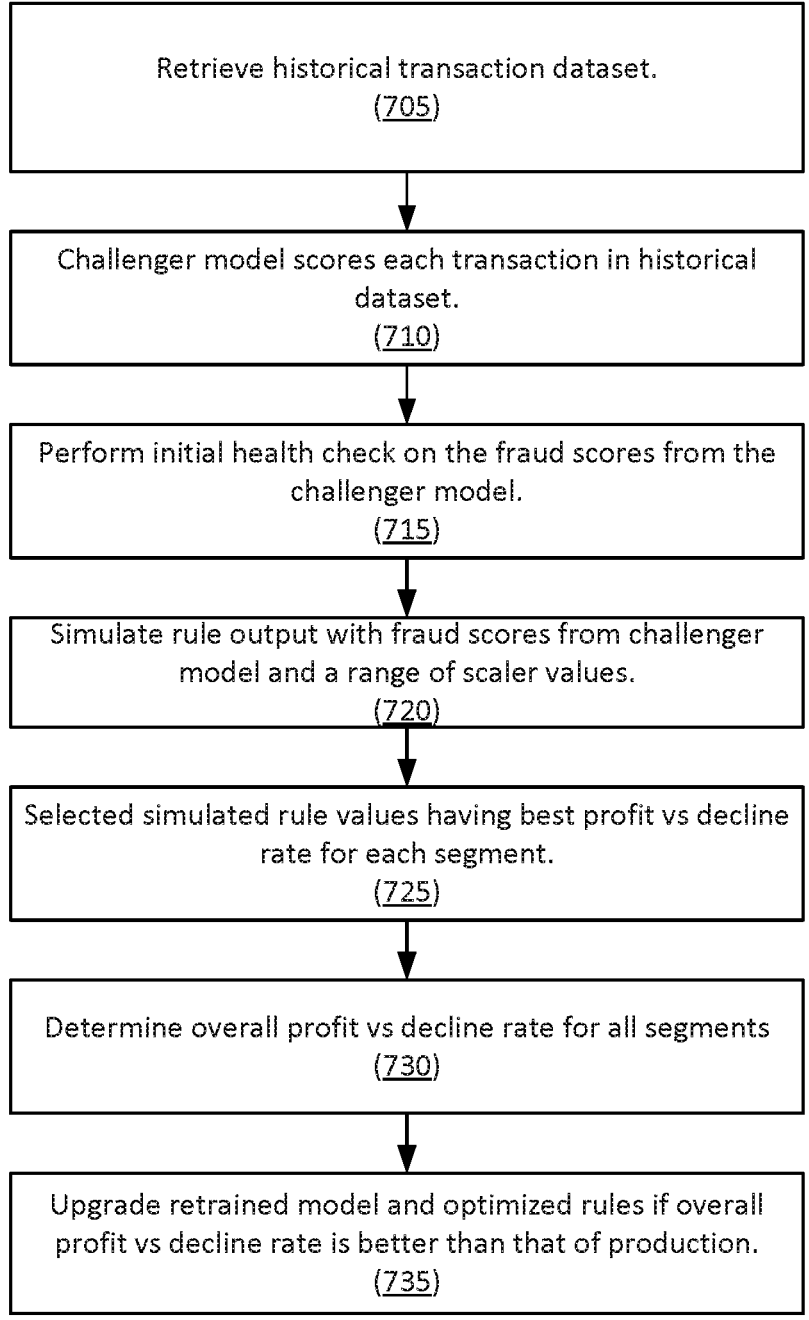
FIG. 7 is a logical flow for rule optimization and promotion, in accordance with aspects.

FIG. 7 is a logical flow for rule optimization and promotion, in accordance with aspects. At step 705, a window of historical data can be retrieved from a data store. Data from the time window may be sampled at, e.g., a 5% rate, to reduce the size of the dataset. The historical data can include transactions for the time window. The transactions from the time window can be associated with scores (e.g., fraud scores) from a production ML model. Thus, the retrieved data can include both transactions and those transactions' production fraud scores. The production fraud scores can form a benchmark dataset of fraud scores.

At step 710, a retrained and reweighted challenger model can receive the historical transactions as input and score each transaction. At step 715 an initial health check can be performed on the scores from the retrained model, as discussed in detail, above. If the retrained model passes the initial health check, the process continues. At step 720, rule output can be simulated. Using the fraud scores from the retrained model as fraud scores in the rules, and using a range of scaler settings for the fraud score and the ROI value, rules for different segments in a rules scheme can be simulated.

At step 725, the simulated rule providing the greatest profit vs decline rate for each segment can be selected for that segment. At step 730, an overall profit vs decline rate can be determined based on each segments profit vs decline rate. At step 730, the profit vs decline rate for the retrained and reweighted model and the optimized rules can be compared with that of the production model and rules, and if the profit vs decline rate for the retrained and reweighted model (the challenger model) and the optimized rules is greater than that of the production model and rules, then, at step 735, the challenger model and optimized rules can be promoted to the production environment.

Figure 8:
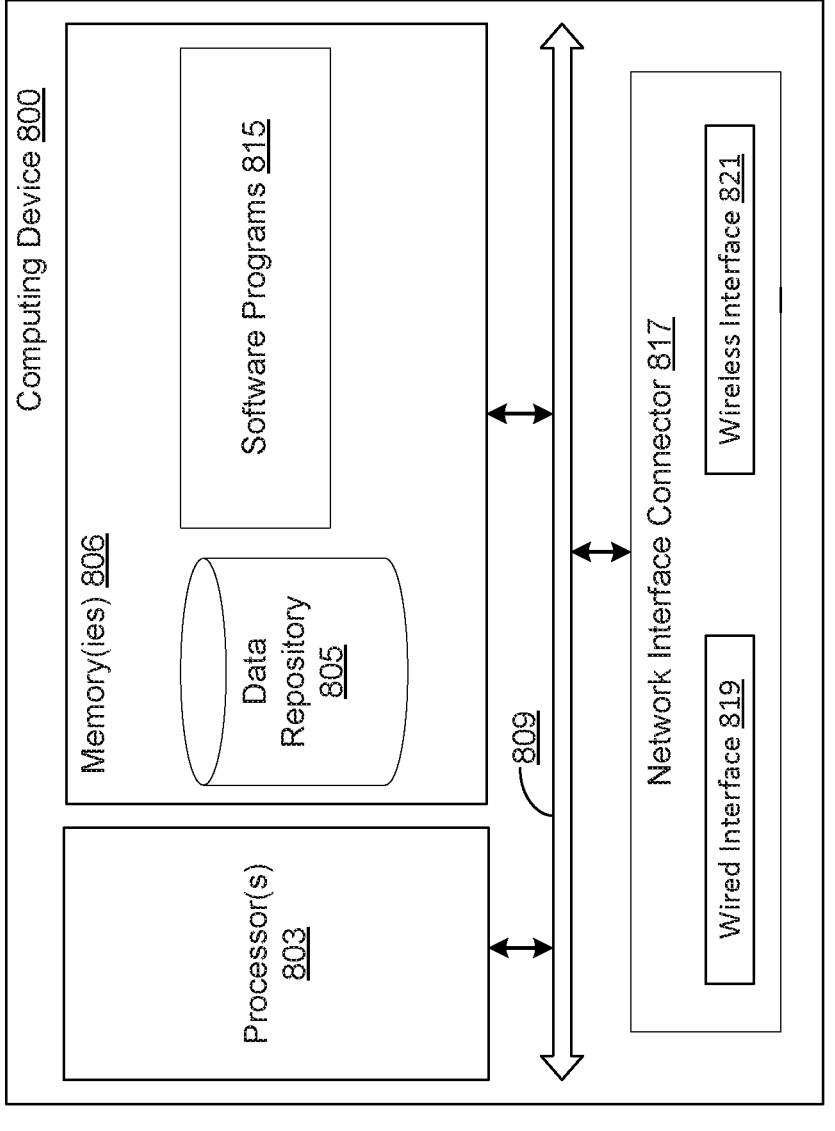
FIG. 8 is a block diagram of a computing device for implementing certain aspects of the present disclosure.

FIG. 8 is a block diagram of a computing device for implementing certain aspects of the present disclosure. FIG. 8 depicts exemplary computing device 800. Computing device 800 may represent the system components described herein. For example, system components such as a ML model engine, health check engine, a rule simulation engine, a scaler optimization engine, a data prep engine, a variable aggregation engine, and/or a model weight optimization engine may include components and configurations like or similar to computing device 800. Computing device 800 includes a processor 803 coupled to a memory 806. Memory 806 may include volatile memory. The processor 803 executes computer-executable program code stored in memory 806, such as software programs 815. Software programs 815 may include one or more of the logical steps disclosed herein as a programmatic instruction, which can be executed by processor 803. Memory 806 may also include data repository 805, which may be nonvolatile memory for data persistence. The processor 803 and the memory 806 may be coupled by a bus 809. In some examples, the bus 809 may also be coupled to one or more network interface connectors 817, such as wired network interface 819, and/or wireless network interface 821. Computing device 800 may also have user interface components, such as a screen for displaying graphical user interfaces and receiving input from the user, a mouse, a keyboard and/or other input/output components (not shown).

The various processing steps and/or data flows depicted in the figures and described in greater detail herein may be accomplished using some or all of the system components also described herein. In some implementations, the described logical steps may be performed in different sequences and various steps may be omitted. Additional steps may be performed along with some or all of the steps shown in the depicted logical flow diagrams. Some steps may be performed simultaneously. Accordingly, the logical flows illustrated in the figures and described in greater detail herein are meant be exemplary and, as such, should not be viewed as limiting. These logical flows may be implemented in the form of executable instructions stored on a machine-readable storage medium and/or in the form of electronic circuitry.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or main-frame, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, aspects of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an Open-Step™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications or equivalent arrangements.

The invention claimed is:

1. A method for frequent machine learning model retraining and rule optimization in a payment transaction fraud detection system implemented by at least one computing device, comprising:

generating a challenger machine learning model based on a production machine learning model;

training the challenger machine learning model on a plurality of datasets, wherein each of the plurality of datasets includes data records collected on a date defined as a number of days previous to a current date, wherein the plurality of datasets include historical payment transaction data;

scoring the historical payment transaction data with the challenger machine learning model, wherein the scoring produces a respective score for each record of a plurality of records in the plurality of datasets, wherein the scoring produces respective fraud scores for said each record of the plurality of records;

determining that the challenger model performs within predetermined thresholds based on the scoring;

selecting an optimal scaler value for a rule based on execution of the rule with a range of scaler values applied to the respective score for said each record of the plurality of records evaluated by the rule;

determining that the optimal scaler value outperforms a production scaler value; and promoting the challenger model and the optimal scaler value to a production environment to automatically process payment transaction data for fraud detection by (1) calculating a model score of the payment transaction data and assigning a return on investment value to the payment transaction data based on variables of the payment transaction data and (2) calculating a fraud score of the payment transaction data.

2. The method of claim 1, wherein the plurality of datasets includes a first dataset, and wherein the first dataset includes data records collected on a date defined as 1 day previous to the current day;

wherein the plurality of datasets includes a second dataset, and wherein the second dataset includes data records collected on a date defined as 14 days previous to the current day; and wherein the plurality of datasets includes a third dataset and wherein the third dataset includes data records collected on a date defined as 90 days previous to the current day.

3. The method of claim 1, wherein the rule is a segment rule for a segment, and wherein the segment is defined by a transaction type.

4. The method of claim 3, wherein the segment is one of a plurality of segments, and where each segment of the plurality of segments is defined by a different rule type.

5. The method of claim 4, wherein said each segment of the plurality of segments includes a segment rule and wherein said each segment rule includes a scaler value of which can be set independently.

6. The method of claim 1, wherein the plurality of datasets includes data collected within a predetermined time window.

7. The method of claim 6, wherein the predetermined time window is from the date defined as 1 day previous to the current date to the date defined as 14 days previous to the current date.

8. The method of claim 1, wherein the challenger machine learning model is based on an extreme gradient boosting algorithm.

9. A system for frequent machine learning model retraining and rule optimization in a payment transaction fraud detection system comprising at least one computing device including a processor, wherein the at least one computing device is configured to:

generate a challenger machine learning model based on a production machine learning model;

train the challenger machine learning model on a plurality of datasets, wherein each of the plurality of datasets includes data records collected on a date defined as a number of days previous to a current date, wherein the plurality of datasets include historical payment transaction data;

score the historical payment transaction data with the challenger machine learning model, wherein the scoring produces a respective score for each record of a plurality of records in the plurality of datasets, wherein the scoring produces respective fraud scores for said each record of the plurality of records;

determine that the challenger model performs within predetermined thresholds based on the scoring;

select an optimal scaler value for a rule based on execution of the rule with a range of scaler values applied to the respective score for said each record of the plurality of records evaluated by the rule;

determine that the optimal scaler value outperforms a production scaler value; and promote the challenger model and the optimal scaler value to a production environment to automatically process payment transaction data for fraud detection by (1) calculating a model score of the payment transaction data and assigning a return on investment value to the payment transaction data based on variables of the payment transaction data and (2) calculating a fraud score of the payment transaction data.

10. The system of claim 9, wherein the plurality of datasets includes a first dataset, and wherein the first dataset includes data records collected on a date defined as 1 day previous to the current day;

wherein the plurality of datasets includes a second dataset, and wherein the second dataset includes data records collected on a date defined as 14 days previous to the current day; and wherein the plurality of datasets includes a third dataset and wherein the third dataset includes data records collected on a date defined as 90 days previous to the current day.

11. The method of claim 9, wherein the rule is a segment rule for a segment, and wherein the segment is defined by a transaction type.

12. The system of claim 11, wherein the segment is one of a plurality of segments, and where each segment of the plurality of segments is defined by a different rule type.

13. The system of claim 12, wherein said each segment of the plurality of segments includes a segment rule and wherein said each segment rule includes a scaler value of which can be set independently.

14. The system of claim 9, wherein the plurality of datasets includes historical data is data collected within a predetermined time window.

15. The system of claim 14, wherein the predetermined time window is from the date defined as 1 day previous to the current date to the date defined as 14 days previous to the current date.

16. A non-transitory computer readable storage medium, including instructions stored thereon for frequent machine learning model retraining and rule optimization in a payment transaction fraud detection system, which when read and executed by one or more computers cause the one or more computers to perform steps comprising:

generating a challenger machine learning model based on a production machine learning model;

training the challenger machine learning model on a plurality of datasets, wherein each of the plurality of datasets includes data records collected on a date defined as a number of days previous to a current date, wherein the plurality of datasets include historical payment transaction data;

scoring the historical payment transaction data with the challenger machine learning model, wherein the scoring produces a respective score for each record of a plurality of records in the plurality of datasets, wherein the scoring produces respective fraud scores for said each record of the plurality of records;

determining that the challenger model performs within predetermined thresholds based on the scoring;

selecting an optimal scaler value for a rule based on execution of the rule with a range of scaler values applied to the respective score for said each record of the plurality of records evaluated by the rule;

determining that the optimal scaler value outperforms a production scaler value; and promoting the challenger model and the optimal scaler value to a production environment to automatically process payment transaction data for fraud detection by (1) calculating a model score of the payment transaction data and assigning a return on investment value to the payment transaction data based on variables of the payment transaction data and (2) calculating a fraud score of the payment transaction data.

* * * * *